(12) United States Patent
Chang et al.

(10) Patent No.: US 7,451,304 B2
(45) Date of Patent: Nov. 11, 2008

(54) BASIC INPUT OUTPUT SYSTEM SELECTION DEVICE

(75) Inventors: Chao-Huang Chang, Taipei (TW); Chi-Cheng Chia, Taipei (TW)

(73) Assignee: Inventec Corporation, Taipei (TW)

( * ) Notice: Subject to any disclaimer, the term of this patent is extended or adjusted under 35 U.S.C. 154(b) by 428 days.

(21) Appl. No.: 11/341,749

(22) Filed: Jan. 27, 2006

(65) Prior Publication Data

US 2007/0033390 A1    Feb. 8, 2007

(30) Foreign Application Priority Data

Aug. 8, 2005    (TW) ............................... 94126689 A

(51) Int. Cl.
*G06F 9/24*      (2006.01)
*G06F 15/177*    (2006.01)
(52) U.S. Cl. ................................. 713/2; 713/1; 713/100
(58) Field of Classification Search .................... 713/1, 713/2, 100
See application file for complete search history.

(56) References Cited

U.S. PATENT DOCUMENTS

| 5,797,023 A * | 8/1998 | Berman et al. ............... 713/324 |
| 2004/0268116 A1* | 12/2004 | Vasisht et al. ............... 713/100 |
| 2005/0033954 A1* | 2/2005 | Wang et al. .................... 713/2 |

* cited by examiner

*Primary Examiner*—Dennis M Butler
(74) *Attorney, Agent, or Firm*—Jianq Chyun IP Office

(57) ABSTRACT

A basic input output system (BIOS) selection device is applicable in an electronic device. The BIOS selection device includes a storage unit and a control unit, which are mounted on a mainboard of the electronic device. The storage unit includes a first chip and a second chip, each of which includes a primary BIOS module and a secondary BIOS module. The control unit includes a signal module for producing a first chip selection signal and a second chip selection signal, and a switch module having a first switch component and a second switch component. The BIOS selection device can realize two dual BIOS mechanisms on the same mainboard for a user to select one of the dual BIOS mechanisms to boot the electronic device without having to purchase another mainboard for using a different dual BIOS mechanism unlike the prior art.

12 Claims, 2 Drawing Sheets

BASIC INPUT OUTPUT SYSTEM SELECTION DEVICE

FIELD OF THE INVENTION

The present invention relates to technologies for booting electronic devices, and more particularly, to a basic input output system (BIOS) selection device for providing an electronic device with two dual BIOS mechanisms, for a user to select one of the dual BIOS mechanisms to boot the electronic device.

BACKGROUND OF THE INVENTION

Basic Input Output System (BIOS) is a program stored in a Read Only Memory (ROM) on a mainboard of an electronic device and is firmware used for communication between hardware and an operating system of the electronic device. A system operating mechanism and hardware parameters of the electronic device can be set via the BIOS. Important programs associated with the electronic device such as basic input output program, system information setting program, Power On Self Test (POST) program, system bootstrap program and so on are stored in the BIOS. When the electronic device is booted, the BIOS calls the stored relevant programs to perform tests on the electronic device, and after the tests are completed, the operating system is loaded to a primary memory such as dynamic random access memory (DRAM) of the electronic device. However, if the BIOS is damaged by virus, the booting procedure of the electronic device cannot succeed.

In light of the above problem, a dual BIOS module mechanism is employed in the electronic device, which comprises an inherent primary BIOS module and an additional secondary BIOS module. When the primary BIOS module is damaged, the secondary BIOS module can execute the booting procedure of the electronic device and recover the primary BIOS module. Conventional dual BIOS module technology is characterized by mounting two BIOS chips on the mainboard, wherein one serves as a primary BIOS module and the other serves as a secondary BIOS module. When the electronic device is booted, the secondary BIOS module automatically detects a status of the primary BIOS module, and rewrites the primary BIOS module if any damage is detected in the primary BIOS module, so as to ensure the primary BIOS module always in a proper status. If the damage of the primary BIOS module cannot be recovered, the electronic device can be booted by the secondary BIOS module. The dual BIOS module mechanism requires two BIOS chips and thus has a relatively higher cost.

To address the cost issue, a separating BIOS technology is introduced such as SafeBIOS technology without necessarily using two BIOS chips. The separating BIOS technology is characterized by mounting a 4 MB BIOS chip on the mainboard, which is twice in capacity as large as a general BIOS chip, wherein the 4 MB BIOS chip is separated into two segments, one is a primary BIOS segment and the other is a secondary BIOS segment. The secondary BIOS segment boots the electronic device and automatically recovers the primary BIOS segment when the primary BIOS segment is damaged. Therefore, only one BIOS chip is required for such separating BIOS mechanism and does not increase the production cost. However, such technology raises reliability and security issues. If the BIOS chip is physically damaged, both the two BIOS segments fail and the electronic device cannot be successfully booted. Accordingly, the separating BIOS technology is not suitable for a case having the entire BIOS chip damaged.

The first invented portable BIOS module is named Air Bus, which builds a BIOS chip in a small card. If the BIOS module on the mainboard of the electronic device is defective, the card can be inserted into a specific slot formed on the mainboard such that the BIOS module in the card can boot the electronic device and recover the BIOS module on the mainboard. However, it is not convenient to always carry the card, and additionally having the card leads to a cost issue.

All the above types of the dual BIOS technology only provide one dual BIOS mechanism. If a user considers the current dual BIOS mechanism not suitable and wishes to use another dual BIOS mechanism, he/she needs to replace the mainboard with another one having the desirable dual BIOS mechanism, thereby causing a waste of time and money to the user.

Therefore, the problem to be solved here is to provide a BIOS selection device for integrating two dual BIOS mechanisms on a single mainboard of an electronic device and for a user to select one of the dual BIOS mechanisms to boot the electronic device, thereby avoiding a waste of time and money.

SUMMARY OF THE INVENTION

In light of the foregoing drawbacks of the prior art, a primary objective of the present invention to provide a BIOS selection device for integrating two dual BIOS mechanisms on a single mainboard of an electronic device such that a user can select one of the dual BIOS mechanisms to boot the electronic device without having to purchase another mainboard for using a different dual BIOS mechanism unlike the prior art.

In order to achieve the above and other objectives, the present invention proposes a BIOS selection device applied in an electronic device. The BIOS selection device comprises: a storage unit and a control unit, which are mounted on a mainboard of the electronic device. The storage unit includes a first chip and a second chip, wherein each of the first and second chips includes a primary BIOS module and a secondary BIOS module. The control unit includes a signal module and a switch module, wherein the signal module can produce a first chip selection signal and a second chip selection signal, and the switch module includes a first switch component and a second switch component. The control unit is electrically connected to the storage unit, such that by selecting the primary BIOS module of the first or second chip and selecting the secondary BIOS module of the first or second chip through the use of the signal module and the switch module, two dual BIOS mechanisms can be realized.

The BIOS selection device of the present invention allows the storage unit to provide four BIOS modules for selection to realize the two dual BIOS mechanisms including a dual BIOS module mechanism and a separating BIOS mechanism. In other words, the BIOS selection device of the present invention allows a user to select one of the two dual BIOS mechanisms provided on one mainboard of the electronic device, unlike the prior art that a single mainboard can only incorporate one dual BIOS mechanism and the user needs to obtain another mainboard for using a different dual BIOS mechanism. Therefore, by the BIOS selection device of the present invention, the two dual BIOS mechanisms are provided on one mainboard of the electronic device, and any one of the two dual BIOS mechanisms can be flexibly selected to boot the electronic device, thereby improving the operational efficiency and reducing the cost such that the drawbacks in the prior art are overcome.

BRIEF DESCRIPTION OF DRAWINGS

The present invention can be more fully understood by reading the following detailed description of the preferred embodiments, with reference made to the accompanying drawings, wherein.

DETAILED DESCRIPTION OF PREFERRED EMBODIMENTS

Figure 1:
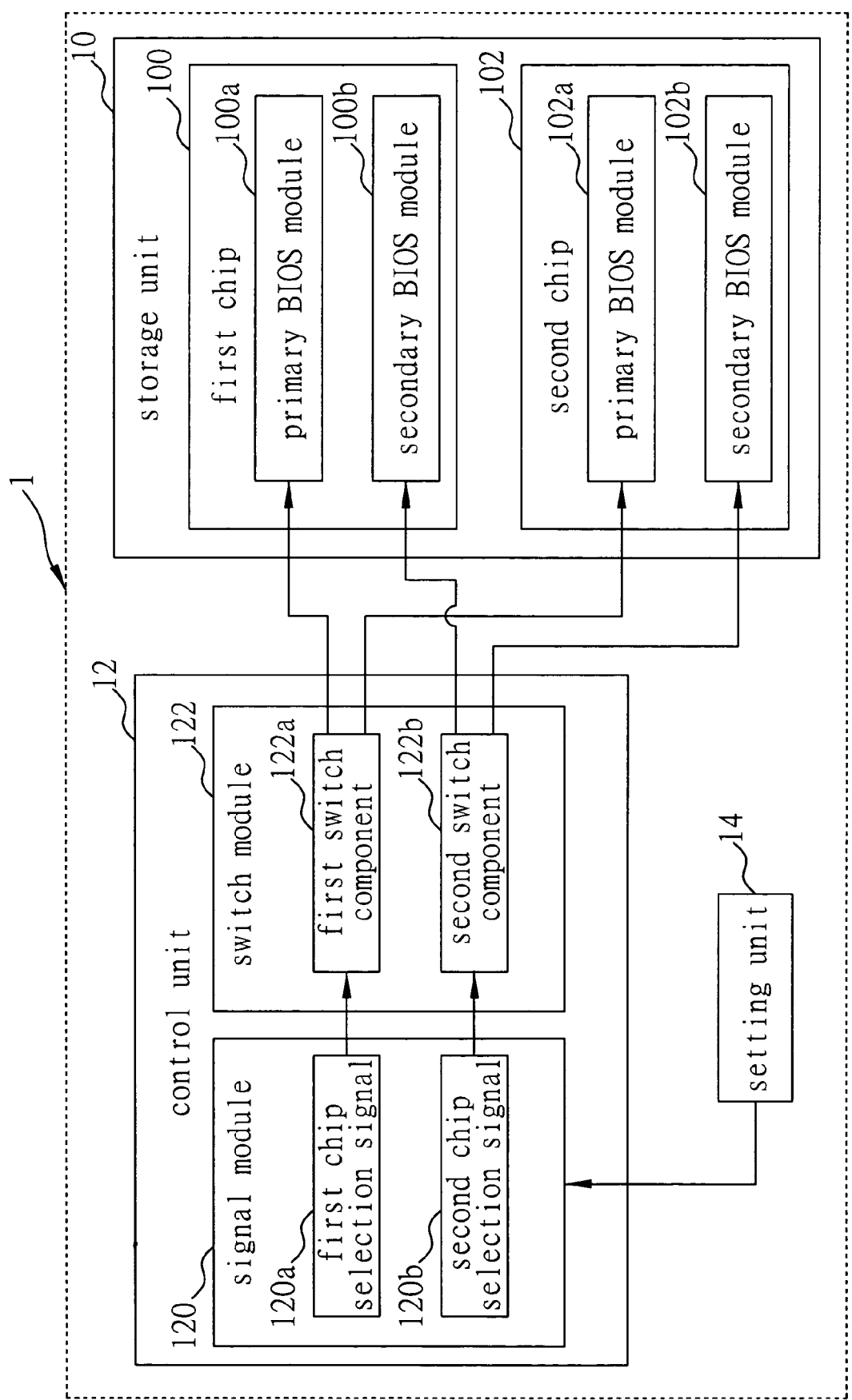
FIG. 1 is a schematic block diagram showing architecture of a BIOS selection device according to the present invention.

FIG. 1 shows architecture of a BIOS selection device 1 proposed in the present invention. The BIOS selection device 1 comprises a storage unit 10, a control unit 12 and a setting unit 14, which are mounted on a mainboard of an electronic device.

The storage unit 10 comprises a first chip 100 and a second chip 102. The first chip 100 includes a primary BIOS module 100a and a secondary BIOS module 100b, and the second chip 102 includes a primary BIOS module 102a and a secondary BIOS module 102b. Thus, the storage unit 10 provides four BIOS modules for selection. The first chip 100 and the second chip 102 can be respectively a first memory and a second memory that are operationally independent from each other. Each of the first memory and the second memory can be an Erasable Programmable Read Only Memory (EPROM), an Electrically Erasable Programmable ROM (EEPROM) or a Flash ROM.

The control unit 12 is electrically connected to the storage unit 10. The control unit 12 comprises a signal module 120 and a switch module 122, wherein the signal module 120 can produce a first chip selection signal 120a and a second chip selection signal 122a, and the switch module 122 includes a first switch component 122a and a second switch component 122b. The first chip selection signal 120a and the second chip selection signal 120b are configured for use with the first switch component 122a and the second switch component 122b respectively. Each of the first chip selection signal 120a and the second chip selection signal 120b can be in a high level voltage status or in a low level voltage status. The first switch component 122a and the second switch component 122b serve as binary control switches for performing a binary switch operation according to the statuses of the first chip selection signal 120a and the second chip selection signal 120b respectively. The first chip selection signal 120a and the corresponding first switch component 122a are used for selecting the primary BIOS module 100a of the first chip 100 or the primary BIOS module 102a of the second chip 102, and the second chip selection signal 120b and the corresponding second switch component 122b are used for selecting the secondary BIOS module 100b of the first chip 100 or the secondary BIOS module 102b of the second chip 102. In particular, the first switch component 122a switches to the primary BIOS module 100a of the first chip 100 if the first chip selection signal 120a is at the high level status, and switches to the primary BIOS module 122a of the second chip 122 if the first chip selection signal 120a is at the low level status. The second switch component 122b switches to the secondary BIOS module 100b of the first chip 100 if the second chip selection signal 120b is at the high level status, and switches to the secondary BIOS module 102b of the second chip 102 if the second chip selection signal 120b is at the low level status.

Accordingly, by interaction between the first chip selection signal 120a, the first switch component 122a, the second chip selection signal 120b and the second switch component 122b, four situations are generated as follows. (1) If the first chip selection signal 120a and the second chip selection signal 120b are both at the high level status, the first switch component 122a switches to the primary BIOS module 100a of the first chip 100 and the second switch component 122b switches to the secondary BIOS module 100b of the first chip 100, such that a separating BIOS mechanism is defined and selected. (2) If the first chip selection signal 120a is at the high level status and the second chip selection signal 120b is at the low level status, the first switch component 122a switches to the primary BIOS module 100a of the first chip 100 and the second switch component 122b switches to the secondary BIOS module 102b of the second chip 102, such that a dual BIOS module mechanism is defined and selected. (3) If the first chip selection signal 120a is at the low level status and the second chip selection signal 120b is at the high level status, the first switch component 122a switches to the primary BIOS module 102a of the second chip 102 and the second switch component 122b switches to the secondary BIOS module 100b of the first chip 100, such that the dual BIOS module mechanism is selected. (4) If the first chip selection signal 120a and the second chip selection signal 120b are both at the low level status, the first switch component 122a switches to the primary BIOS module 102a of the second chip 102 and the second switch component 122b switches to the secondary BIOS module 102b of the second chip 102, such that the separating BIOS mechanism is selected. Therefore, two, i.e. the dual BIOS module mechanism and the separating BIOS mechanism, are realized and can be flexibly selected by a user through the use of the BIOS selection device of the present invention.

The setting unit 14 is electrically connected to the control unit 12, and is used to store and set parameters for the control unit 12 to regulate the chip selection signals of the signal module 120 and control the switch operation performed by the switch module 122 so as to select the dual BIOS module mechanism or the separating BIOS mechanism according to the parameters. For instance, the selection of the dual BIOS mechanism can be determined at time intervals of continuous operation (weeks or months, etc.) or at specific time points, or according to the type of operating system of the electronic device. The parameters can be flexibly altered or adjusted by the user if necessary. The setting unit 14 can be installed in at least one of the first and second chips 100, 102, or in a separate memory such as an EPROM, EEPROM or Flash ROM.

Figure 2:
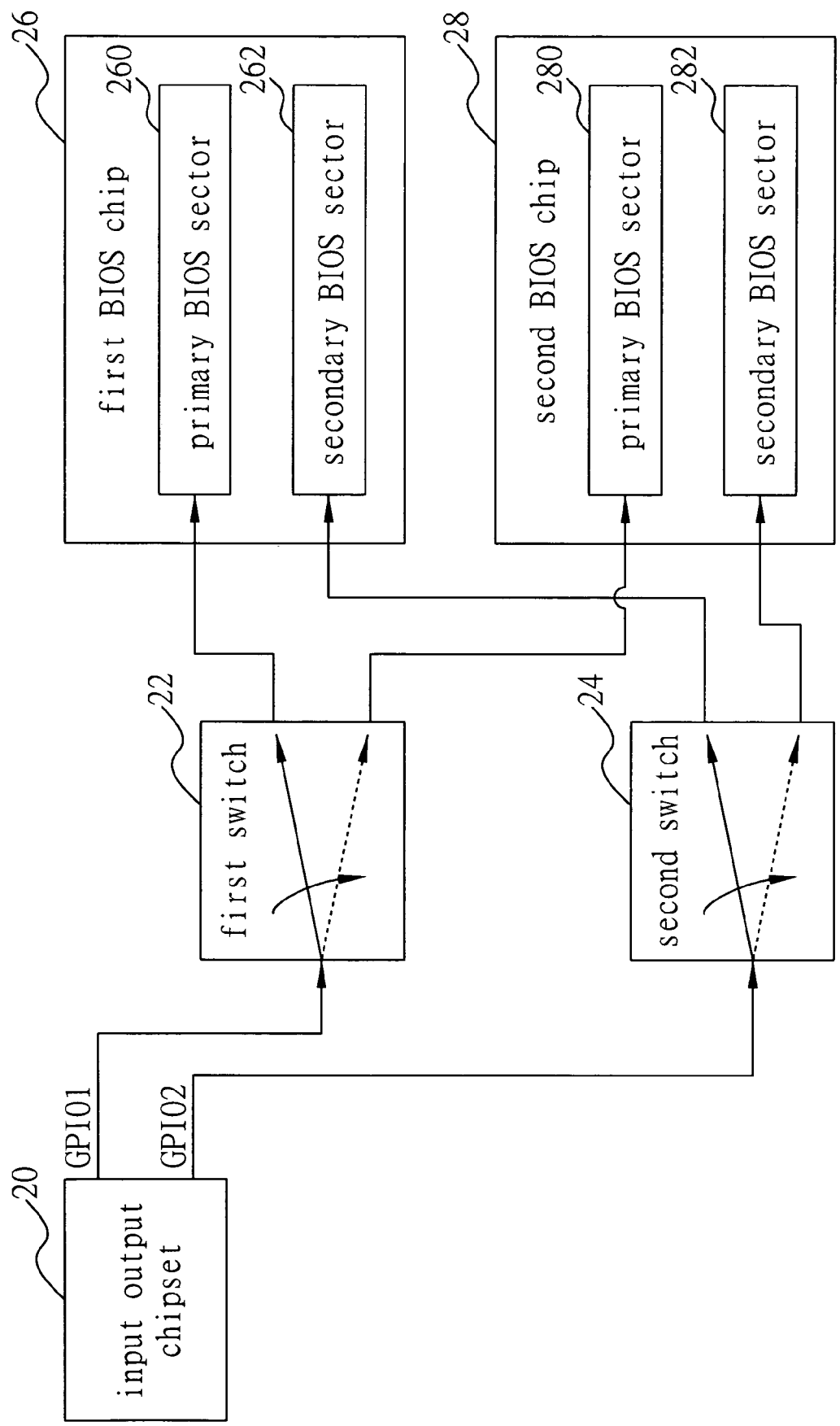
FIG. 2 is a schematic block diagram showing a circuit structure of the BIOS selection device in operation according to the present invention.

FIG. 2 shows a circuit structure of the BIOS selection device in operation according to the present invention. As shown in FIG. 2, the circuit structure comprises an input output (IO) chipset 20, a first switch 22, a second switch 24, a first BIOS chip 26 and a second BIOS chip 28, which are provided on a mainboard of the electronic device. The IO chipset 20 corresponds to the signal module 120 of FIG. 1; the first and second switches 22, 24 correspond to the first and second switch component 122a, 122b of FIG. 1 respectively; and the first and second BIOS chips 26, 28 correspond to the first and second chips 100, 102 of FIG. 1 respectively.

The first BIOS chip 26 and the second BIOS chip 28 are two independently operative memories. Each of the first BIOS chip 26 and the second BIOS chip 28 can be an EPROM, EEPROM or Flash ROM. The first BIOS chip 26 is divided into a primary BIOS segment 260 and a secondary BIOS segment 262, and the second BIOS chip 28 is divided into a primary BIOS segment 280 and a secondary BIOS segment 282. The IO chipset 20 comprises two general purpose input output (GPIO) registers: a first GPIO register (GPIO1) and a second GPIO register (GPIO2). The GPIO1 outputs a first chip selection signal to the first switch 22, wherein the first chip selection signal can be in a high level voltage status or a low level voltage status according to the parameters stored in the setting unit 14 of FIG. 1. The GPIO2 outputs a second chip selection signal to the second switch 24, wherein the second chip selection signal can be in a high level voltage status or a low level voltage status according to the parameters stored in the setting unit 14 of FIG. 1. The first switch 22 is used to select the primary BIOS segment 260 of the first BIOS chip 26 or the primary BIOS segment 280 of the second BIOS chip 28 according to the status of the first chip selection signal from the GPIO1. The second switch 24 is used to select the secondary BIOS segment 262 of the first BIOS chip 26 or the secondary BIOS segment 282 of the second BIOS chip 28 according to the status of the second chip selection signal from the GPIO2.

If the first chip selection signal from the GPIO1 and the second chip selection signal from the GPIO2 are both at the high level status, the first switch 22 switches to the primary BIOS segment 260 of the first BIOS chip 26 and the second switch 24 switches to the secondary BIOS segment 262 of the first BIOS chip 26, such that a separating BIOS mechanism is defined and selected. Or, if the first chip selection signal from the GPIO1 is at the high level status and the second chip selection signal from the GPIO2 is at the low level status, the first switch 22 switches to the primary BIOS segment 260 of the first BIOS chip 26 and the second switch 24 switches to the secondary BIOS segment 282 of the second BIOS chip 28, such that a dual BIOS module mechanism is defined and selected. Or, if the first chip selection signal from the GPIO1 is at the low level status and the second chip selection signal from the GPIO2 is at the high level status, the first switch 22 switches to the primary BIOS segment 280 of the second BIOS chip 28 and the second switch 24 switches to the secondary BIOS segment 262 of the first BIOS chip 26, such that the dual BIOS module mechanism is selected. Or, if the first chip selection signal from GPIO1 and the second chip selection signal from GPIO2 are both at the low level status, the first switch 22 switches to the primary BIOS segment 280 of the second BIOS chip 28 and the second switch 24 switches to the secondary BIOS segment 282 of the second BIOS chip 28, such that the separating BIOS mechanism is selected.

Therefore, the user can flexibly select any one of the two dual BIOS mechanisms such as the dual BIOS module mechanism and the separating BIOS mechanism provided on the same mainboard of the electronic device through the use of the BIOS selection device of the present invention so as to properly boot the electronic device, without having to purchase another mainboard for using a different dual BIOS mechanism unlike the prior art, thereby effectively reducing the cost and overcoming the drawback in the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A basic input output system (BIOS) selection device applicable in an electronic device, the BIOS selection device comprising:

a storage unit mounted on a mainboard of the electronic device and comprising a first chip and a second chip, wherein each of the first and second chips includes a primary BIOS module and a secondary BIOS module; and a control unit electrically connected to the storage unit and mounted on the mainboard of the electronic device, the control unit comprising:

a signal module for outputting selection signals; and a switch module for receiving the selection signals from the signal module, and for selecting the primary BIOS module of one of the first and second chips and the secondary BIOS module of one of the first and second chips according to the selection signals.

2. The BIOS selection device of claim 1, wherein the selection signals outputted from the signal module comprise a first chip selection signal and a second chip selection signal, wherein each of the first and second chip selection signals has a high level voltage status and a low level voltage status.

3. The BIOS selection device of claim 2, wherein the switch module comprises a first switch component and a second switch component respectively for receiving the first chip selection signal and the second chip selection signal from the signal module.

4. The BIOS selection device of claim 3, wherein the first chip selection signal and the first switch component are for selecting the primary BIOS module of one of the first and second chips, and the second chip selection signal and the second switch component are for selecting the secondary BIOS module one of the first and second chips.

5. The BIOS selection device of claim 4, wherein each of the first and second switch components is a binary control switch.

6. The BIOS selection device of claim 4, wherein the primary BIOS module of the first chip is selected by the first switch component and the secondary BIOS of the first chip is selected by the second switch component if both the first and second chip selection signals are at the high level status.

7. The BIOS selection device of claim 4, wherein the primary BIOS module of the first chip is selected by the first switch component if the first chip selection signal is at the high level status, and the secondary BIOS module of the second chip is selected by the second switch component if the second chip selection signal is at the low level status.

8. The BIOS selection device of claim 4, wherein the primary BIOS module of the second chip is selected by the first switch component if the first chip selection signal is at the low level status, and the secondary BIOS module of the first chip is selected by the second switch component if the second chip selection signal is at the low high status.

9. The BIOS selection device of claim 4, wherein the primary BIOS module of the second chip is selected by the first switch component and the secondary BIOS module of the second chip is selected by the second switch component if both the first and second chip selection signals are at the low level status.

10. The BIOS selection device of claim 1, wherein each of the first and second chips is a memory.

11. The BIOS selection device of claim 10, wherein the memory is one of an Erasable Programmable Read Only Memory (EPROM), an Electrically Erasable Programmable ROM (EEPROM) and a Flash ROM.

12. The BIOS selection device of claim 1, wherein the signal module is an input output chipset.

* * * * *